Nov. 5, 1940. R. A. SCHAFER 2,220,806
WAY CLEANER
Filed Aug. 31, 1938
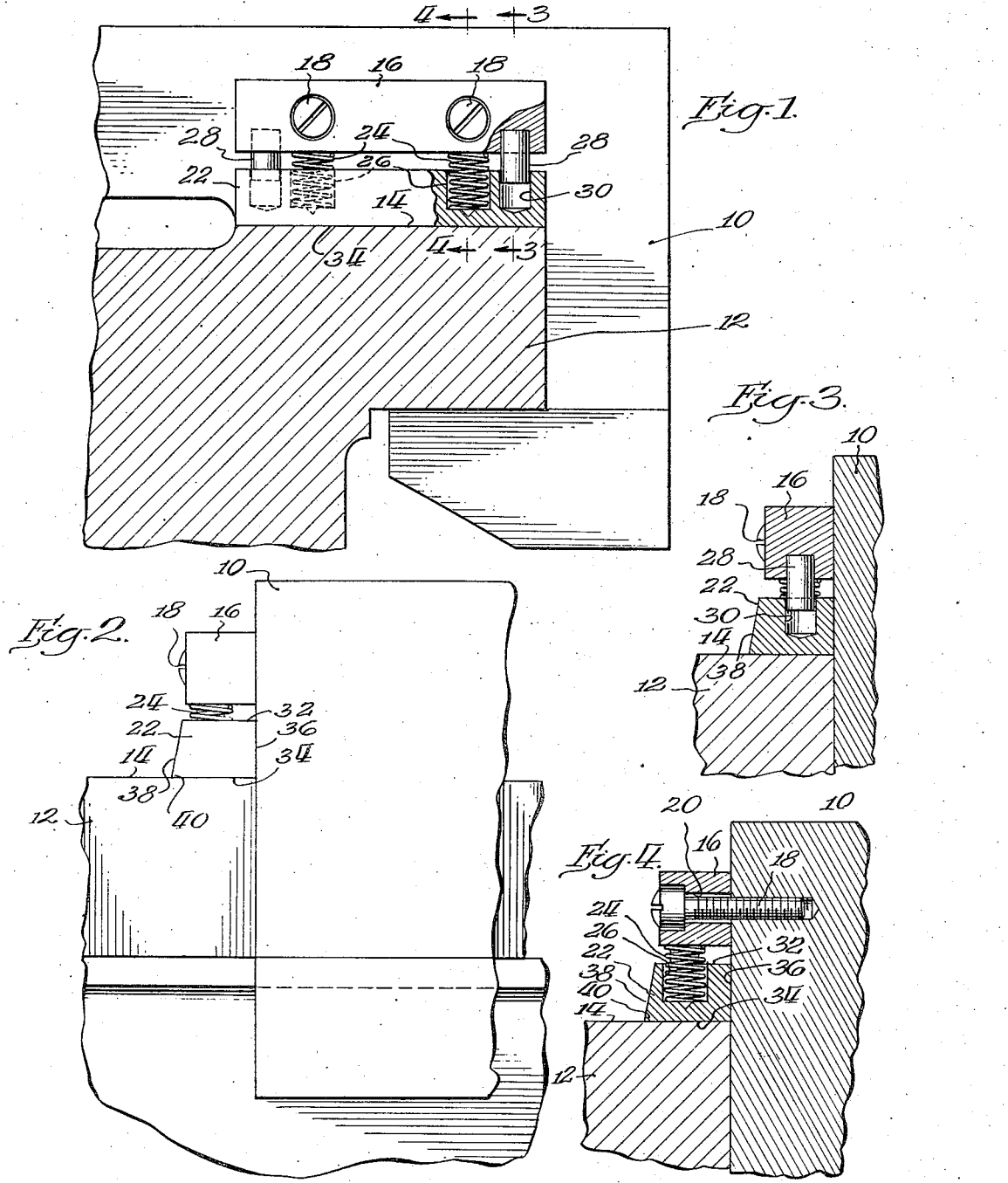
Inventor.
Robert A. Schafer Patented Nov. 5, 1940

2,220,806

UNITED STATES PATENT OFFICE 2,220,806

WAY CLEANER

Robert A. Schafer, Richmond, Ind., assignor to The National Automatic Tool Company, Richmond, Ind., a corporation of Indiana Application August 31, 1938, Serial No. 227,625

2 Claims. (Cl. 308—5)

My invention relates generally to improvements in means for cleaning chips and other foreign matter from the guide ways of machine tools.

It is a well recognized difficulty in connection with the use and maintenance of machine tools having carriages or tool bearing heads which are slidable upon ways, that chips of metal and other particles of foreign matter fall upon the ways and by being wedged between the bearing surface of the carriage or head and the bearing surface of the way, scratch and score the bearing surfaces with the eventual result that the bearing surfaces become so irregular that the ways or the cooperating bearing surfaces of the head, or both, must be remachined or rescraped.

Since the precision of a tool of the character described is in great part dependent upon the condition of the ways and the condition of the cooperating bearing surfaces of the carriage or head, it is essential that the surfaces be very accurately finished, and in relatively large machine tools the final operations of finishing the ways are necessarily hand-scraping operations. The costs of refinishing the bearing surfaces of the ways and carriage are therefore exceedingly high, not only because of the length of time required of the workman in hand finishing the surfaces, but also due to the fact that this hand finishing operation requires the services of a highly skilled and highly paid workman. Furthermore, the refinishing of the ways usually requires that the ways, and frequently the entire bed of the machine, be returned to the factory, with the resultant extended loss of time in the use of the machine tool and high shipping costs.

Due to all of these factors, it is of extremely great importance to machine tool manufacturers and machine tool users that adequate means be provided to prevent scoring of the cooperating bearing surfaces of the ways and the carriage or tool head. In the past there have been many proposals of various means for preventing chips from becoming lodged between the bearing surfaces of the ways and the carriage, such means being generally of two different categories: (1) devices such as shields, screens, and the like which were positioned over the ways to prevent chips and foreign matter from falling thereupon; (2) wiping means for removing such chips as may have fallen upon the ways. In general, devices of the first class have been found impracticable because of the extensive and cumbersome mechanism necessary since the cover or screen above the way must necessarily be movable to permit the carriage to travel over the ways and, further, because, even with a most careful design of such means, chips or other foreign matter would occasionally fall upon the bearing surfaces and scoring and serious damage to the ways could result without being noticed by the machine operator because inspection of the ways usually required the removal of the guards or screens. Thus considerable damage to the bearing surfaces frequently occurred before the operator was aware that a chip or other foreign matter had become embedded in one of the bearing surfaces and was continuously scoring the cooperating bearing surface.

The second general method of preventing damage to the ways by chips and other foreign matter resided in providing a cleaner or scraper which was attached to the carriage or head and was supposed to wipe clean the bearing surface of the ways as the carriage or head progressed therealong. While such means were generally effective to remove the larger chips and particles from the way surfaces, they were usually made of such material as felt, wood, asbestos, packing composition, synthetic rubber compositions, and occasionally of sheet brass and similar materials. Cleaners made of these materials soon became charged with minute particles of metal, emery dust and the like, and thus acted as abrasives against the bearing surfaces of the ways. This was true in the case of scrapers made of brass, cast iron and the like, all of which either were so soft that the minute particles of the hard steel chips became embedded therein, or, if they were made of sufficiently hard material themselves, acted as scrapers and gouged particles of metal from the bearing surfaces of the ways. As a result it has been found necessary by machine tool users periodically to reship machine tools to the manufacturer for overhauling, the principal operation to be performed being the refinishing of the ways.

It is the principal object of my invention to provide an improved way cleaner which will be very efficient and effective in the removal of foreign particles from the surfaces of the ways and which will thus greatly extend the useful life of the machine tool and make unnecessary the relatively frequent refinishing of the ways.

A further object of my invention is to provide an improved way cleaner which does not operate by a wiping or a scraping action, but instead operates as a shear in removing foreign particles from the way bearing surfaces.

A further object is to provide an improved way cleaner made of sufficiently hard material that particles of foreign matter will not become embedded therein.

A further object is to provide an improved way cleaner in which the leading edge is sharpened to a high degree of accuracy and is held resiliently in contact with the bearing surface of the way in a manner such that the leading edge lies so close to the bearing surface of the way that even the most minute particles of foreign matter are sheared from the bearing surface as the way cleaner is advanced therealong.

Other objects will appear from the following description, reference being had to the accompanying drawing in which Figure 1 is a transverse sectional view of a portion of the ways of a machine tool showing a portion of the carriage in elevation and my improved way cleaner in fragmentary section;

Figure 2 is a side elevation of the way cleaner attached to a carriage mounted upon a way; and Figures 3 and 4 are transverse sectional views of the way cleaner and adjacent parts of the carriage and ways taken on the lines 3—3 and 4—4, respectively, of Figure 1.

Referring to the drawing, a carriage or tool carrying head 10 is generally illustrated as being reciprocable upon the ways 12 having a horizontal bearing surface 14 from which chips and similar particles of foreign matter are to be removed. A block 16 is rigidly secured to the carriage or head 10 by a plurality of cap screws 18 which project through counter-bored holes 20 formed in the block 16. The way cleaner comprises a blade 22 which is pressed downwardly against the bearing surface 14 of one of the ways by a pair of compression coil springs 24 which rest in recesses 26 formed in the blade 22, and which abut against the lower surface of the block 16. The blade 22 is held against lateral and longitudinal movement with respect to the block 16 by a pair of pins 28 which are pressed into suitable holes drilled in the block 16 and project downwardly into sockets 30 formed in the upper surface of the blade 22.

The blade 22 has parallel top and bottom surfaces 32 and 34, respectively, and has a vertical surface 36 which is in contact with the vertical surface of the carriage 10. The surface 38 opposite the surface 36 is at an angle of approximately 15 degrees to the vertical so as to provide a relatively sharp edge 40 at its juncture with the surface 34.

The blade 22 is preferably made of a hardened tool steel and has its surface 34 ground very accurately so that the springs 24 will hold the latter surface in full contact with the bearing surface 14 of the ways. As a result the edge 40 is always maintained in a line contact with the bearing surface 14. The edge 40 thus acts as a cutting tool with respect to the adhesion of any foreign particles to the surface 14 and shears such particles from this surface. The action is not that of a scraper since the weight of the blade and the pressure of the springs 24 are evenly distributed over the surface of contact between the surfaces 34 and 14. Thus there is no tendency of the edge 40 to scrape the surface 14 of the way 12 and remove metal particles therefrom. Instead, the edge 40 slides smoothly over the surface 14 an infinitesimal distance therefrom, the distance being so small that even the finest particles of dust and grit are sheared from the surface 14, and thus do not have an opportunity to wedge between the surface 14 and the cooperating bearing surface of the carriage 10. The bearing surfaces of the ways are thus properly cleaned in advance of the carriage and scoring and other damage to the ways by particles of foreign matter are thereby prevented. The ways may thus have a useful life far exceeding that obtainable by any other known means for cleaning the ways with resultant economy in the upkeep of the machine. The only wear upon the bearing surfaces of the ways and carriage is that necessary or incidental to the rubbing action of the carriage itself upon the ways.

The way cleaner as illustrated in Figure 1 is applied only to the horizontal bearing surface of the way, but it can, of course, with equal advantage be applied to the vertical surface thereof and, if found necessary, to the downwardly facing horizontal surfaces of the ways.

The way cleaner will ordinarily be attached to each end of the carriage or other part of the machine movable upon the ways so that the shearing edge will clean the bearing surface of the way upon both the forward and reverse movements of the carriage or head.

While I have shown herein a particular embodiment of my invention, it will be apparent to those skilled in the art that numerous variations in the specific form of the invention may be made without departing from the underlying principles thereof. The following claims are intended to include all such variations and modifications of my invention by which substantially the same results thereof may be obtained in substantially the same way.

I claim:

1. In a machine tool having a way and a carriage slidable over said way, a way cleaner comprising a blade of relatively hard tool steel having a relatively large smoothly finished surface in engagement with the bearing surface of said way, said blade being connected to said carriage so as to move therewith over said way, the leading edge of said blade comprising a surface at an angle slightly less than ninety degrees with said smoothly finished surface, whereby said edge acts as a shear in removing particles of foreign matter from the bearing surface of the way as said carriage advances, and resilient means acting between said blade and said carriage to hold the finished surface of said blade in contact with the bearing surface of said way.

2. In a machine tool, the combination of a bed having ways, a carriage member slidably mounted in said ways, a way cleaning blade of material harder than said ways and having a relatively large surface for contact with a bearing surface of said ways, said blade having a shearing edge formed in part by said surface and in part by another surface meeting the former at an angle of less than ninety degrees, said edge being located at the leading edge of said blade when said carriage member is moving in the direction in which said blade leads the carriage member, and means for securing said blade to said carriage member, said means comprising parts holding said blade against movement with respect to said carriage except in a direction perpendicular to the bearing surface of said ways, and resilient means for pressing said blade against the bearing surface of said ways.

ROBERT A. SCHAFER